United States Patent
Walterman

[11] Patent Number: 6,061,469
[45] Date of Patent: May 9, 2000

[54] OBJECT RENDERING SYSTEM TO PRODUCE X-RAY LIKE IMAGES

[75] Inventor: Michael Thomas Walterman, Framingham, Mass.

[73] Assignee: Mitsubishi Electric Information Technology Center America, Inc (ITA), Cambridge, Mass.

[21] Appl. No.: 09/102,260

[22] Filed: Jun. 22, 1998

[51] Int. Cl.[7] .............................. G01N 23/83; G01T 1/00; G06T 15/00; G06T 17/10
[52] U.S. Cl. ......................... 382/154; 382/132; 345/420; 395/500.28; 395/500.32
[58] Field of Search .................................. 382/128, 132, 382/154, 274, 285, 293, 100; 348/121; 345/419–427; 434/262; 702/8, 40, 172; 395/500.27, 500.28, 500.32; 364/578; 600/416; 378/901

[56] References Cited

U.S. PATENT DOCUMENTS

| | | | |
|---|---|---|---|
| 4,899,318 | 2/1990 | Schlumberger et al. | 367/8 |
| 4,920,491 | 4/1990 | Eberhard et al. | 364/413.19 |
| 5,081,993 | 1/1992 | Kitney et al. | 128/661.08 |
| 5,226,113 | 7/1993 | Cline et al. | 395/124 |

OTHER PUBLICATIONS

Julian Rosenman et al., Virtual Simulation: Initial Clinical Results, Int. J. Radiation Oncology Biol. Phys., vol. 20, pp. 843–851, Apr. 1991.

Benjamin M. W. Tsui, Evaluation of Cardiac Cone–Beam Single Photon Emission Computed Tomography Using Observer Performance Experiments and Receiver Operating Characteristic Analysis, Investigative Radiology, vol. 28, No. 12, pp. 1101–1112, Dec. 1993.

K. J. LaCroix et al., Investigation of the Use of X–ray CT Images for Attenuation Compensation in SPECT, IEEE Transactions on Nuclear Science, vol. 41, No. 6, pp. 2793–2799, Dec. 1994.

R. A. Robb et al., Interactive Display and Analysis of 3–D Medical Images, IEEE Transactions on Medical Imaging, vol. 8, No. 3, pp. 217–226, Sep. 1989.

*Primary Examiner*—Leo H. Boudreau
*Assistant Examiner*—Brian P. Werner
*Attorney, Agent, or Firm*—Dirk Brinkman

[57] ABSTRACT

An object rendering system having a specialized algorithm is provided to convert a material and geometric description of an object to an X-Ray image of that object for use in medical applications and industrial non-destructive testing, thus to permit presentation of an object not the result of X-Ray in an X-Ray format. The system operates by considering that the object is composed of nested geometric solids, each defined by an enclosing surface, with the material property of each nested solid being defined in terms of an X-Ray mass-attenuation coefficient. Means for adjusting the mass attenuation coefficient of each of the enclosing surfaces is provided to permit each solid to be rendered independently.

7 Claims, 5 Drawing Sheets

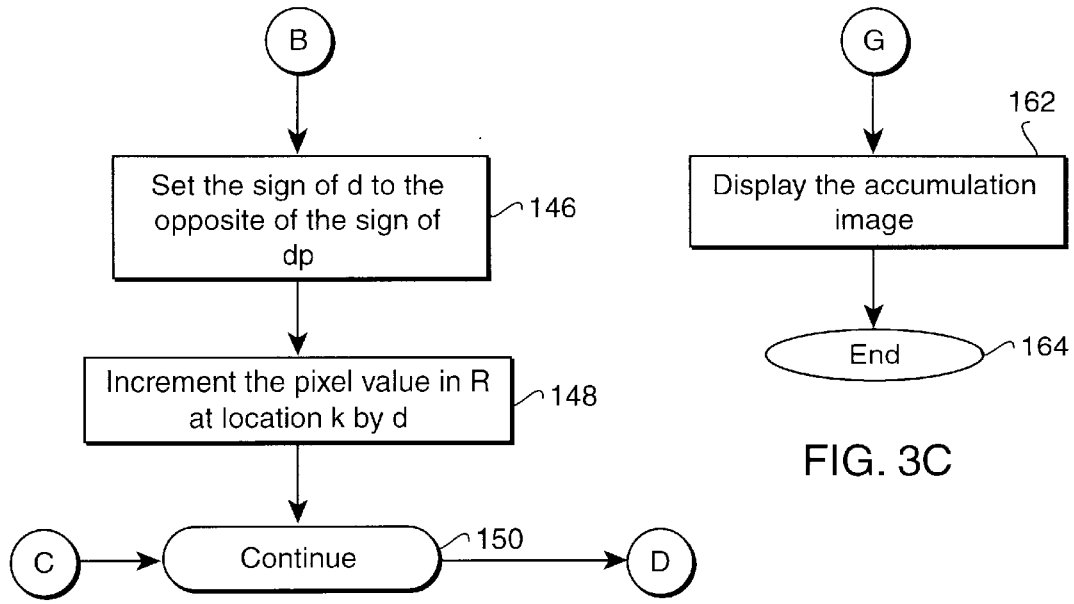
FIG. 3B
FIG. 3C
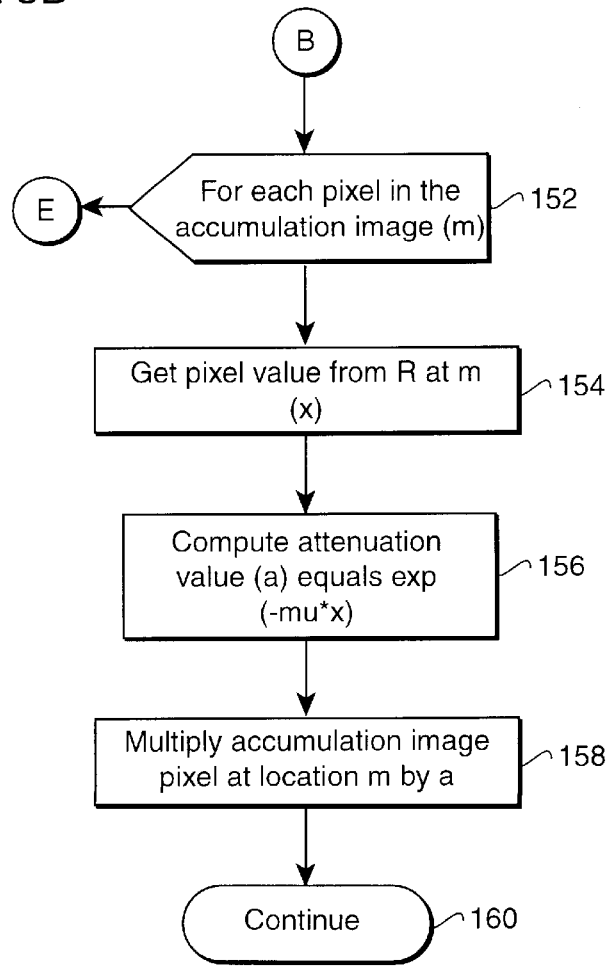
FIG. 3D

OBJECT RENDERING SYSTEM TO PRODUCE X-RAY LIKE IMAGES

FIELD OF INVENTION

This invention relates to rendering systems and more particularly to a non-voxel based system for rendering synthetic X-Ray images.

BACKGROUND OF THE INVENTION

The standard methods of rendering synthetic X-Ray images uses voxel based rendering. In this methodology, each object is composed of small solid elements called voxels. The voxels are then Ray traced to generate the rendered image. There are two limitations to this process. First, the number of voxels required to approximate an object can be very large. This poses a problem to most computer graphics systems in that such large amounts of data can not be processed quickly enough for some applications. Second, voxels define inflexible objects in that they can not change shape. If an object's global geometry changes, "voxelation", or the describing of the new global geometry in terms of a new collection of voxels can be computationally expensive and algorithmically complex.

SUMMARY OF THE INVENTION

In order to provide a simpler and less computationally intense system for rendering objects so as to simulate X-Ray image formation, the subject system converts non-voxel object data to data which is presentable in an X-Ray format by simulating passing X-Rays through an object, simulating the attenuation and considering the object to be one of material embedded within material, e.g. boundaries within boundaries, surfaces within surfaces, or shells within shells.

In order to accomplish the rendering, it has been found that an object may be decomposed into a number of solids which can be considered to be nested one inside the other. These solids, in general, are bounded by surfaces which are detectable through the utilization of a ray which passes into and out of the solid. These surfaces can be located in terms of the simulated passings of a photon beam which is attenuated by the solid as it passes through. Thus, a surface of the solid can be obtained through traditional computer graphics descriptions which in one embodiment utilizes vectors in a graphics space having a direction corresponding to the direction of a given group of photons and a magnitude corresponding to the number of unattenuated photons.

The subject system thus takes a solid and decomposes it into a number of nested solids. The purpose of this nesting is to be able to obtain predetermined features of the solid at interior locations defined by the above nestings. It will be appreciated that the determination of nested surfaces or boundaries is considerably less complex than defining each interior element of a solid by a voxel.

The surfaces of the solids are modeled by standard 3D visual modeling packages to create the nested boundaries. The interior of each solid is assigned a mass-attenuation coefficient based on its real-world value and the mass-attenuation coefficient of the solid that encloses that boundary. These models are then registered in a 3D coordinate system that includes the photon emitter and imaging surface via a scene graph which relates all the objects in the scene.

Thereafter, the data in the scene graph is rendered in a manner which approximates the images one would obtain when passing X-Rays through an object. More particularly, the subject system provides an X-Ray like image through the use of 3D models of an object, a simulated photon emission through the object, and all of its nested solids, and detected by a simulated X-Ray camera which outputs an image.

The 3D models, in one embodiment, are hand done based on an expert's knowledge of the solid to be modeled. For instance, a surgeon may wish to specify the inner layers of a heart by specifying tissue densities for the myocardium and boundaries for various heart chambers. Alternatively, the data set for the 3D model may be obtained from CT scans, and the resulting voxelized data. This is advantageous assuming one can reduce many similar and adjacent voxels into a single solid. As a result, the rendering process for producing an image of the solids in all of its nested layers or surfaces can be accomplished with substantially less data, and similarly reduced processing.

The above permits real-time animation of the solids/volumes by altering surface geometry as opposed to computing a new set of voxels. As a result, the subject system permits simulating a beating heart in a format which is easily understood by medical residents who are used to looking at X-Ray images. Another major application of the subject technique is in the art of non-destructive testing. Here, a training system could be devised in which machined parts having flaws are modeled, with the resulting 3D models being utilized to teach quality control specialists toy presenting to them, in an X-Ray format, those images which they are to evaluate. In this application, it is normal for quality control specialists to utilize X-Ray inspection systems, with the subject system thus providing a valuable training tool.

More particularly, the subject system employs an algorithm that exploits an interesting mathematical property of photon beam attenuation through solid objects. Considering the process of photon beam attenuation, given a solid bar of length L with a square cross-section where each side is of length S, one can consider what will happen when a beam of photons is projected into one of the faces of the bar. In short, some or indeed most of the photons will either scatter out of or be absorbed by the bar. The mathematical relationship describing this absorption is given by:

$$I(E)=I_o(E)\exp(-mu(E)*L) \qquad \text{Equation 1}$$

where:
$I_o(E)$=the intensity of the incoming photon stream as a function of photon energy (number of photons at a particular energy impinging upon the face of the bar during a particular time period);
$I(E)$=the number of photons leaving the bar on the opposite end as a function of photon energy;
$mu(E)$=the attenuation coefficient for this object as a function of photon energy;
$\exp(\ )$=a function that raises euler's constant to a power;
L=the length of the bar; and,
E=the energy per photon in the incident beam.

One can consider what happens if a particular material is embedded within another material. This attenuation can be computed as follows:

$I=I_o\ (E)*\exp(-mu1(E)*(F2-F1))*\exp(-mu2(E)*\exp(-mu1(E)*(B1-B2)))=I_o\ (E)*\exp(-mu2(E)-mu1(E))*(B2-F2))*\exp(-mu1(E)*(B1-F1))$ The rendering algorithm uses the fact that rendering the complete object is equivalent to rendering the multiple simple objects. In general, if n objects are nested within each other, one can decompose these objects into n discrete objects, where the attenuation coefficient of each object is the difference between its original attenuation coefficient and the original coefficients of the object surrounding it.

In particular, the rendering algorithm can be implemented as follows:

The initial X-Ray rendering algorithm required the use of "nested" convex objects to produce accurate results. Thereafter, a technique has been discovered that allows the use of "nested" objects of a more general nature, i.e. convex or non-convex. What is described hereinafter is intended to reflect the changes in the initial rendering algorithm to realize this new level of generality.

The original algorithm is set forth as follows:

I. Set the X-Ray Image to a constant value of $I_o$

II. For all objects to be rendered
   A. Set the maximum Range Image to a small number
   B. Set the minimum Range Image to a large number
   C. Render the object saving the maximum and minimum range values in the maximum and minimum range images respectively
   D. Compute the path length for each pixel by taking the absolute difference between the maximum and minimum range images
   E. Compute the attenuation image using the attenuation function described in Equation 1
   F. Composite the attenuation image into the X-Ray image by multiplying the X-Ray image by the attenuation image and storing the result in the X-Ray Image Note the Range Image refers to an image that is produced knowing the range from the simulated photon source to the surface of the corresponding solid.

The new algorithm replaces steps II.A. through II.D. which results in the following:

I. Set the X-Ray Image to a constant value of $I_o$

II. For all objects to be rendered
   A. Define an eye beam vector and surface patches on the object along this vector
   B. For all surface patches on the object
      1. For all images pixels that correspond to the surface patch
         a. compute the dot product of the eye vector with the surface normal vector
         b. if the dot product is not equal to 0
            1. compute the distance from the eye point to the surface point
            2. Set the sign of the distance to the opposite sign of the dot product
            3. Add the distance to the Range Image Note: at this point, the Range Image contains the path length through the object for each pixel in the image that the object effects.
   C. Compute the attenuation image using the attenuation function described in Equation 1 along with the image computed in the previous step
   D. Composite the attenuation image into the X-Ray image by multiplying the X-Ray image by the attenuation image, storing the result in the X-Ray Image In addition to the use of non-convex objects, this algorithm eliminates the need for minimum and maximum range buffers.

The system's principle benefit comes from the fact that it allows one to use arbitrary geometry, and not just rigid voxels, to represent renderable objects. This reduces the amount of data needed to represent an object, eliminating the high data bandwidth problems. In addition, since the object geometry is flexible, changing object geometry can often mean simply altering the boundary representation, reducing the complexity of the computations for the new geometry.

In summary, an object rendering system having a specialized algorithm is provided to convert a material and geometric description of an object to an X-Ray image of that object for use in medical applications and industrial non-destructive testing, thus to permit presentation of an object not the result of X-Ray in an X-Ray format. The system operates by considering that the object is composed of nested geometric solids, each defined by an enclosing surface, with the material property of each nested solid being defined in terms of an X-Ray mass-attenuation coefficient. Means for adjusting the mass attenuation coefficient of each of the enclosing surfaces is provided to permit each solid to be rendered independently.

In the subject system, object geometry is a solid described by a closed surface in solids geometry often referred to as a "Boundary Representation", with the algorithm allowing objects to be nested inside one another by nesting the boundaries.

Other inputs to the above algorithm are the mathematical description of a simulated X-Ray beam passing through the object and camera geometry including point of view, focal length and response of a filter to the simulated X-Ray beam.

The advantage to such a renderer is the fact that the renderer can serve as a component in a system that simulates the use of X-Ray imaging devices. These simulators are desirable in training environments due to the fact that real X-Ray generating devices, when in operation, can be hazardous to those individuals working with or near the device. The rendering algorithm handles geometric descriptions of objects that are not well suited to standard voxel rendering techniques.

BRIEF DESCRIPTION OF THE DRAWINGS

These and other features of the Subject Invention will be better understood in accordance with the Detailed Description taken in conjunction with the Drawings of which.

DETAILED DESCRIPTION

Figure 1A:
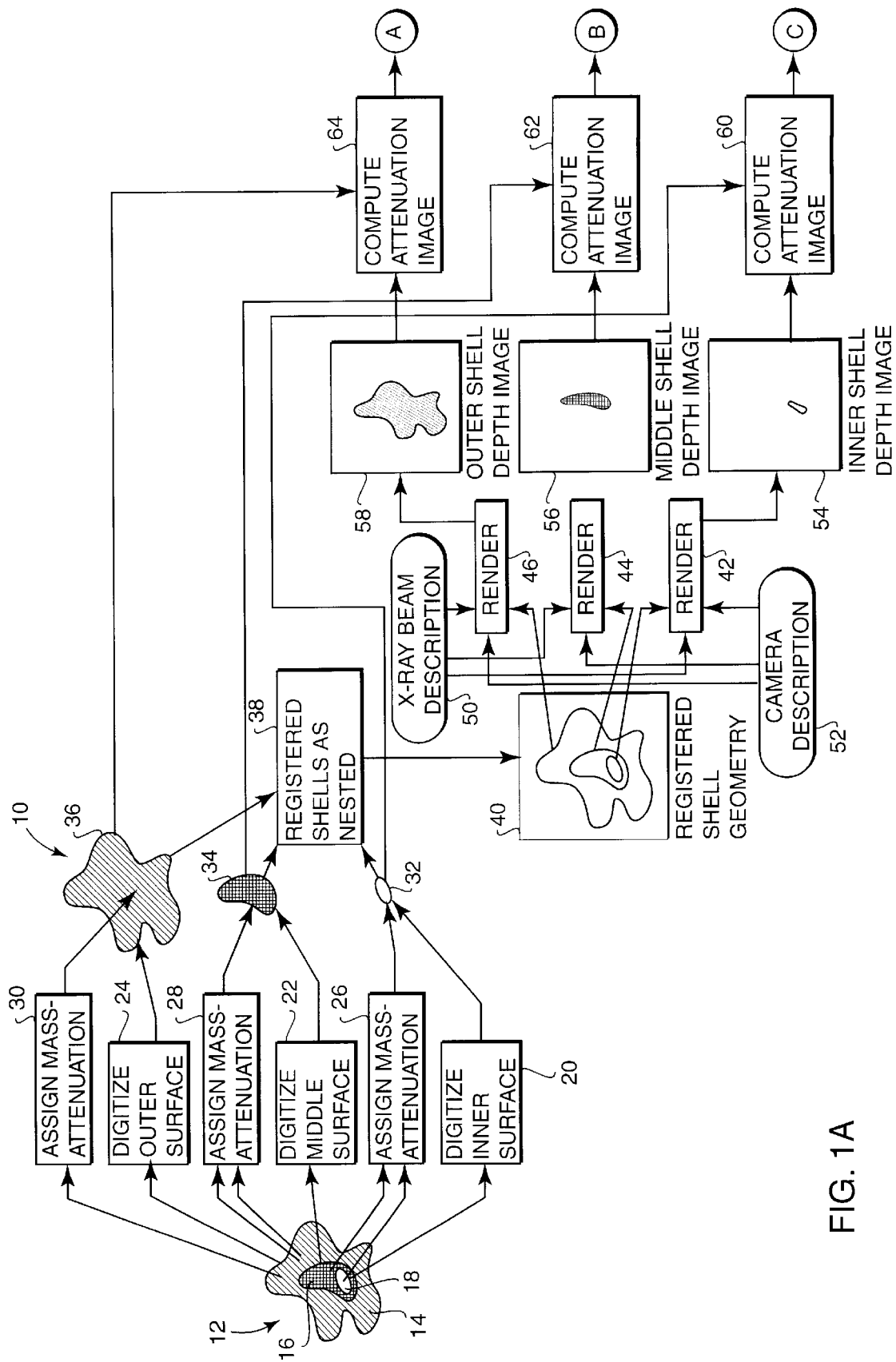
FIGS. 1A and 1B constitute a combined data flow diagram of the subject system showing the initial 3D object with internal solids which are digitized to assign outer surfaces and mass-attenuations, and the application of the subject algorithm to provide shell attenuation images which are combined to provide an X-Ray like image.
Figure 1B:
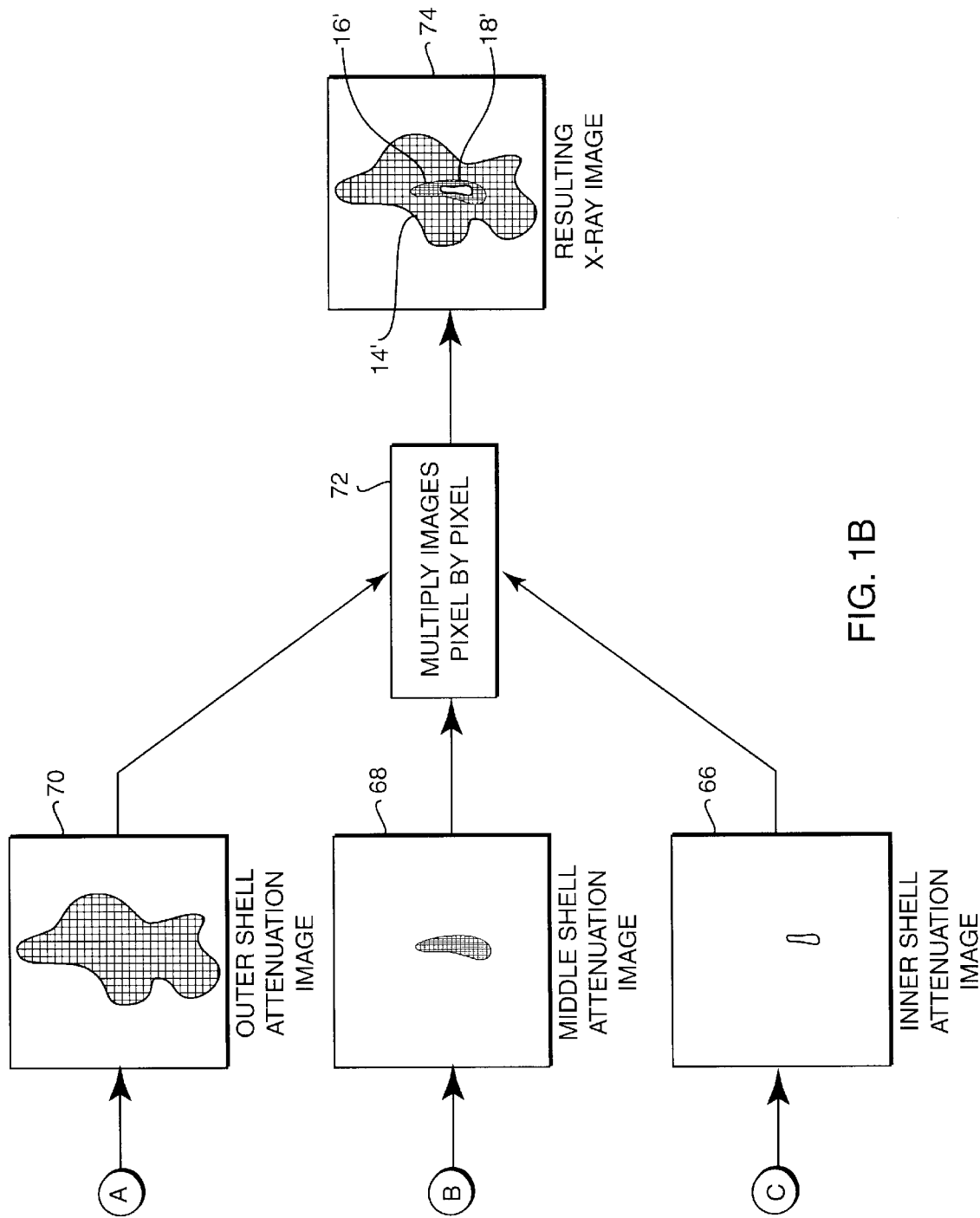

Referring to FIGS. 1A and 1B, a system 10 is shown in which a 3D model 12 having nested solids 14, 16, and 18 is provided as an input. The outer of these nested solids are digitized respectively at 20, 22, and 24. This effectively digitizes the inner surface, the middle surface, and the outer surface of the nested solids. In addition, mass-attenuations are assigned to the respective inner, middle, and outer solids at 26, 28, and 30. The result is a set of shells 32, 34, and 36 corresponding to these surfaces filled with a uniform material having a predetermined mass-attenuation characteristic.

These shells are registered as nested at 38 so as to produce a registered shell geometry 40 for relating the surface geometries to each other. These surface geometries are to be rendered at respective renderers 42, 44, and 46.

The other inputs to the renderers is an X-Ray beam description 50 and a camera description 52. Each of the renderers provides a picture of its respective shell such that an inner shell depth image 54 is made for the inner shell, with a middle shell depth image 56 for the middle shell, and an outer shell depth image 58. The purpose of providing shell depth images is to indicate the distance that a given photon ray passed through the solid. This is important because the resulting pixel value in the image is a function of, in part, the distance traveled through the object by the photon ray. Thereafter, the depth shell images are combined with the mass-attenuation coefficients so as to permit computation of the attenuation image at 60, 62, and 64. This provides the inner, middle, and outer shell attenuation images 66, 68, and 70, shaded to indicate their densities. The attenuation images are combined pixel by pixel in a multiplication process 72, the result of which is a combined simulated X-Ray image 74 with the nested solids 14', 16', and 18' as illustrated.

The result is a formation of an image which describes the inner surfaces and consistency of the original solid in a manner in which the selected surfaces are readily apparent and in which the relative densities are also shown. This provides an excellent training tool to instruct trainees as to the inner characteristics of the object in question.

Figure 2:
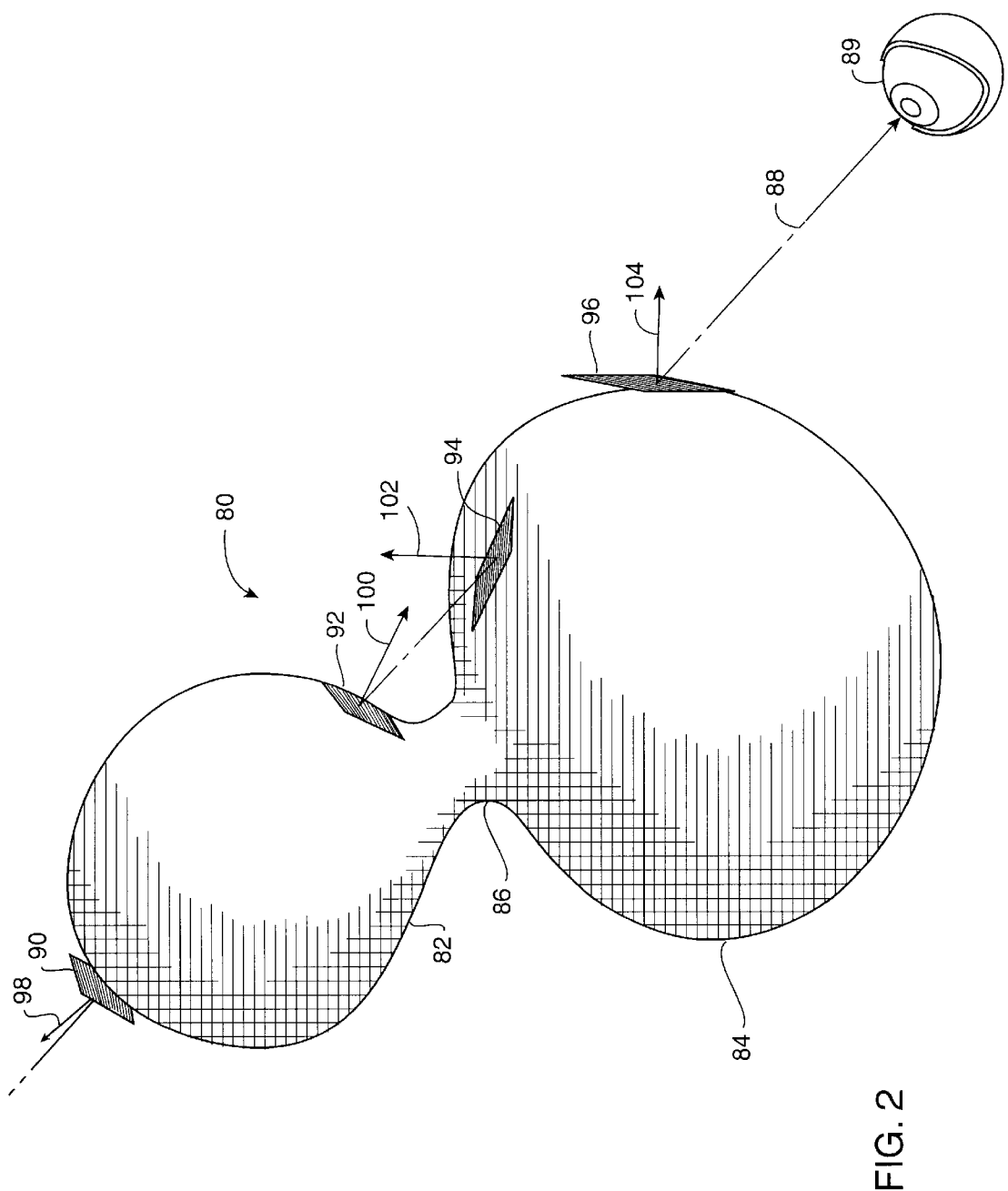
FIG. 2 is a diagrammatic representation of a simulated X-Ray intersecting a non-convex solid in which vectors are obtained for the attenuation and direction of a simulated X-Ray beam, showing that a solid with non-convex surface geometries can be processed by the subject system; and, FIGS. 3A–3D together constitute a flow chart of the algorithm for generating the X-Ray like image from a 3D model of nested solids.

Referring to FIG. 2 a non-convex object 80 is shown having a bulbous upper region 82, a larger lower bulbous region 84, and a necked down portion 86. The purpose of the FIG. 2 is to indicate that it is possible to obtain an accurate path length through a non-convex object. It was originally thought that the system could only accommodate nested convex shells due to the simplicity with which the path length through the nested shells could be described. However, it has been found that non-convex portions of the solid can be adequately described through utilization of dot product comparisons of the eye vector and the surface normals. For purposes of discussion, the simulated X-Ray beam is said to travel through the object along a so called eye vector. Here the eye vector is illustrated by arrow 88 such that the vector points to eye 89 as is conventional, whereas the various surfaces of the object through which the eye vector passes are illustrated at 90, 92, 94, and 96 and are referred to as boundary surface patches. Normals to the surface patches at the entry or exit point of the eye vector are illustrated at 98, 100, 102, and 104.

These normals indicate the direction one follows to exit the solid. The purpose of using the a bove mentioned dot product is to be able to determine space between portions of the solid along the eye vector. In order to determine the voids or open space along this eye vector, one needs to determine entry points and exit points of the eye vector. This is accomplished in ones embodiment by providing a dot product of the eye vector, the surface normal, and determining whether this dot product is either positive, negative, or zero. If the dot product is zero, the ray glances off the object and is not considered to be an entry or exit point. If the dot product is negative, the point of intersection is considered to be an entry point. If the dot product is positive, the point of intersection is considered to be an exit point. The sign of the depth value, which is the distance from the eye or source to the intersection point, is set to the opposite of the sign of the dot product. The corrected depth value is then accumulated into an image. Upon completion of the accumulations, the distance the photon ray passed through the object is contained in the accumulated image.

Knowing an exit point and a subsequent entry point makes clear that there is a void between the exit point and the next entry point.

Figure 3A:
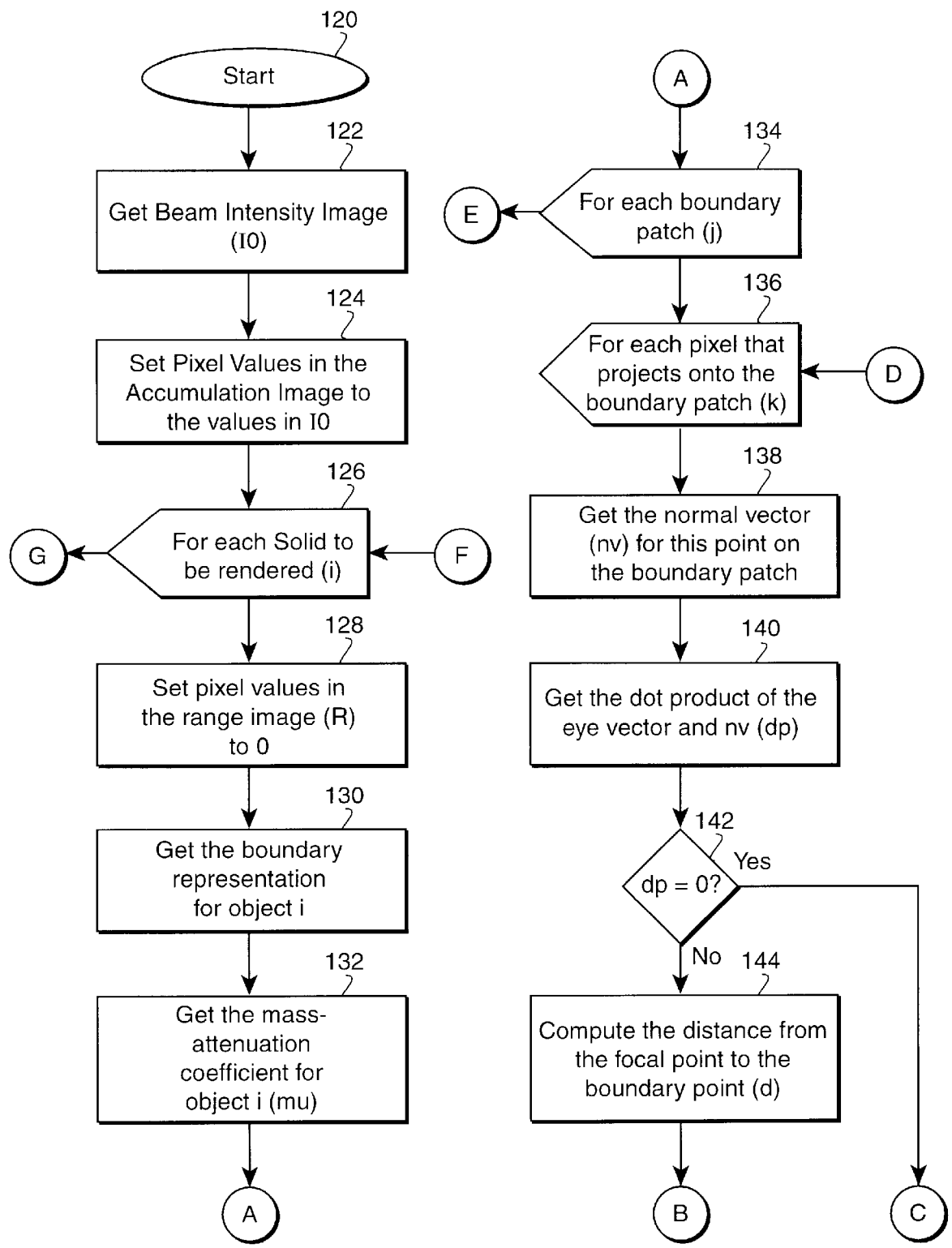

Referring to FIG. 3, what is now described is a flow chart for the subject system. Here the process starts with the registered shell geometry illustrated in FIGS. 1A and 1B at 40 and proceeds through the renderers, the image attenuation computations, the provision of attenuation images, the multiplying of the images together pixel by pixel and ending with the final X-Ray like image as shown at 74.

As will be appreciated, and ref e rring to FIG. 3, when starting at 120, one needs to obtain the beam intensity of an image as illustrated at 122, the purpose of which is to characterize the X-Ray emission and detection when there are no attenuating solids to be imaged, thus to provide a baseline. The baseline image intensity is thus designated $I_o$.

This corresponds to a first pass of the system of FIGS. 1A and 1B in which unit 72, which multiples images pixel by pixel, requires an initial image into which the rendered objects are composited.

Thereafter, as illustrated at 124, pixel values in the accumulation image are set to the values in $I_o$ as derived from unit 122. Then, as illustrated in 126, for each solid to be rendered, denoted by i, the steps are as indicated blocks 128, 130, and 132. As will be described, a loop is performed for each boundary patch j, where the term "boundary patch" refers to a small portion of the boundary of the solid through which the ray passes so that a normal vector can be established for this point and this patch. It is important that these normals be established for each pixel that is projected onto the patch. It is standard practice in computer graphics to decompose the boundary of a solid into small patches that are simply described mathematically.

It is at this juncture that the X-Ray beam description and the camera description is applied to each renderer on a patch by patch basis. Since the boundary of a solid is a collection of patches, the purpose of the loop designated by block 126 is to obtain the various boundaries for each of the nested solids expressed as a list of patches.

This looping process is performed for each solid. As illustrated, for each solid, one must set the pixel values in the range image R to 0 as illustrated at 128, obtain the boundary representation for the object i as illustrated in 130, and obtain the mass attenuation coefficient for the object i (mu), with the result being a complete characterization of the solid.

Thereafter, as illustrated at 134, each patch is processed by this loop to establish a reference to patches that compose the solid's boundary. Thereafter, another loop is performed, as illustrated at 136, which makes sure that the image pixels that project onto the boundary patch are referenced as well.

This referencing is utilized by blocks 138, 140, 142, 144, 146, and 148. As described before, it is important to obtain a normal vector for each point on a boundary patch and to obtain a dot product with the eye vector to be able to compute the path length through the solid. This path length is important in thes rendering because it defines the distance between the entry point and the exit point of a ray. Having established this distance, in order to know whether there is a void or not, the sign of the dot product indicates either an entrance or an exit point.

As can be seen, one first obtains the normal vector (nv) for point k on the boundary patch j. This establishes a correspondence between the point in the patch and the image pixel being formed in the final rendered image.

Thereafter, and as illustrated at 140, one obtains the dct: product of the eye vector and the normal vector to yield a dot product, dp. If the dot product is equal to 0, as illustrated by decision block 142, the process continues as illustrated at 150 which loops back to block 136 for the processing of another pixel in this boundary patch.

If the dot product is not equal to 0, and as illustrated at 144, the system computes the distance from the eye point to boundary patch j point k. This distance is provided to block 146 which sets the sign of the distance, d, to the opposite of the sign of the dot product. Having set the sign of the distance opposite the sign of the dot product, one adds the distance to an accumulation image, such that the pixel value in R at location k is incremented by d. The result of the incrementing is to obtain the path length of the incident ray through the solid object.

Once all the boundary patches have been processed, and as illustrated at 152, the loop allows the resulting image to be composited. This is accomplished by obtaining the pixel value from image R at pixel location m. This value is referred to as x, as illustrated in 154.

The attenuation computation, as illustrated at blocks 60, 62, and 64 of FIGS. 1A and 1B is performed as illustrated at 156 in accordance with the Equation 1 above so as to provide as an output the percentage attenuation of the ray. In other words, after having obtained the path length and the mass attenuation value, it is now possible to complete the rendering of the image. This is accomplished by multiplying the attenuation value into the accumulation image that initially holds $I_o$ and is accomplished at block 158. Note that this is an iterative process that continues, as illustrated at 160, for each pixel until all solids are rendered in memory.

Thereafter, as illustrated at 162, the accumulated image is displayed, and the process ends as illustrated at 164. Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A system for rendering a material and geometric description of an object as a simulated X-Ray image, comprising:

means for decomposing said object into a plurality of solids and a 3D model of said plurality of solids, each of said plurality of solids having a surface and a predetermined mass attenuation coefficient;

means for registering said 3D model in a 3D coordinate system including a source of a simulated X-Ray beam and a scene graph relating said plurality of solids;

means for passing said simulated X-Ray beam through said plurality of solids;

means for determining if said simulated X-Ray beam is entering or exiting a particular one of said plurality of solids;

means responsive thereto for locating a void along a path of said simulated X-Ray beam;

means for attenuating said simulated X-Ray beam according to said material and geometric description and said void; and means responsive to the attenuation of said simulated X-Ray beam for independently rendering said plurality of solids as the simulated X-Ray image.

2. The system of claim 1, wherein said means for determining if said simulated X-Ray beam is entering or exiting said particular nested solid includes means for establishing a surface normal vector at a point where said simulated X-Ray beam enters or exits said particular nested solid, said surface normal vector having a magnitude corresponding to a number of unattenuated simulated photons associated with said simulated X-Ray beam and a direction corresponding to a direction of said simulated photons scattered at said point from said simulated X-Ray beam, and for establishing an eye vector having a direction in the direction of said simulated X-Ray beam and a magnitude equal to a distance between the source of said simulated X-Ray beam and the point where said simulated X-Ray beam enters or exits said particular nested solid.

3. The system of claim 2, wherein said void determining means identifies an image pixel location corresponding to the point on the surface of said particular nested object where said simulated X-Ray beam enters or exits, and means for computing the dot product of said surface normal vector with said eye vector for establishing whether said simulated X-Ray beam is entering or exiting said surface.

4. The system of claim 1, wherein said 3D model is manually formed.

5. The system of claim 1, wherein said 3D model is obtained from a CT scan of a real physical object.

6. A method for rendering a material and geometric description of an object into a simulated X-Ray image of said object comprising the steps of:

providing a 3D model of solids corresponding to portions of said object;

digitizing said solids to provide a surface corresponding to each of said solids;

assigning a mass attenuations coefficient to each solid bounded by each corresponding surface and assigning a corresponding mass attenuation characteristic to said corresponding surface, said surfaces forming shells, each shell having a corresponding predetermined mass attenuation characteristic;

positionally registering said shells in a scene graph to provide a registered shell geometry for relating surface geometries of said shells;

passing a simulated X-Ray beam through said material and geometric description of said object while attenuating said simulated X-Ray beam according to said mass attenuation coefficients and said mass attenuation characteristics;

rendering said shells to obtain a path length of each solid bounded by said shells that said simulated X-Ray beam passes through, so as to provide a depth image picture of each of said shells, thus to indicate a distance traversed by a given ray of said simulated X-Ray beam passing through said corresponding solid;

combining each of said depth shell images with said associated mass attenuation coefficients by computing an attenuation image for each shell using said corresponding mass attenuation coefficient to provide shell attenuation images shaded to indicate a density thereof; and, combining said shaded attenuation images to provide a combined simulated X-Ray image having the solids depicted thereat.

7. The method of claim 6, wherein said rendering step includes the steps of providing a predetermined simulated X-Ray beam description and a predetermined camera description, and calculating the rendered path lengths using said simulated X-Ray beam description and said camera description.

* * * * *